US008295228B2

(12) United States Patent
Tangemann

(10) Patent No.: US 8,295,228 B2
(45) Date of Patent: Oct. 23, 2012

(54) SEMI-STATIC BEAMFORMING METHOD AND APPARATUS THEREOF

(75) Inventor: Michael Tangemann, Leonberg (DE)

(73) Assignee: Alcatel Lucent, Paris (FR)

( * ) Notice: Subject to any disclaimer, the term of this patent is extended or adjusted under 35 U.S.C. 154(b) by 516 days.

(21) Appl. No.: 12/466,672

(22) Filed: May 15, 2009

(65) Prior Publication Data

US 2009/0286547 A1    Nov. 19, 2009

(30) Foreign Application Priority Data

May 16, 2008    (EP) ..................... 08290467

(51) Int. Cl.
*H04W 4/00*    (2009.01)
(52) U.S. Cl. ..................... 370/328; 370/431; 455/422.1
(58) Field of Classification Search .................. None
See application file for complete search history.

(56) References Cited

U.S. PATENT DOCUMENTS

| | | | |
|---|---|---|---|
| 5,566,355 A | 10/1996 | Kanai | |
| 6,347,234 B1* | 2/2002 | Scherzer | 455/562.1 |
| 7,142,864 B2* | 11/2006 | Laroia et al. | 455/450 |
| 7,395,030 B2* | 7/2008 | Yoshida et al. | 455/63.1 |
| 7,664,533 B2* | 2/2010 | Logothetis et al. | 455/562.1 |
| 2006/0009244 A1* | 1/2006 | Schacht et al. | 455/500 |
| 2006/0067269 A1* | 3/2006 | Jugl et al. | 370/329 |
| 2006/0286974 A1* | 12/2006 | Gore et al. | 455/422.1 |

FOREIGN PATENT DOCUMENTS

| | | |
|---|---|---|
| EP | 1 146 665 A1 | 10/2001 |
| JP | 7-170561 | 7/1995 |
| JP | 2006-041562 | 2/2006 |
| WO | WO 97/40639 A1 | 10/1997 |
| WO | WO 03/021993 A1 | 3/2003 |
| WO | WO 03/041218 A1 | 5/2003 |

OTHER PUBLICATIONS

European Search Report.
IEEE Std 802 16e™ 2005 and IEEE Std 802 16™ 2004/Cor1—2005 "Part 16: Air Interface for Fixed and Mobile Broadband Wireless Access Systems Amendment 2 Physical and Medium Access Control Layers for Combined Fixed and Mobil Operation in Licensed Bands and Corrigendum 1", Feb. 26, 2006, pp. 1-864, pp. 353-650 in particular.

* cited by examiner

*Primary Examiner* — Hassan Kizou
*Assistant Examiner* — Roberta A Shand
(74) *Attorney, Agent, or Firm* — Fay Sharpe LLP

(57) ABSTRACT

A beamforming method in a base station for a mobile communication system, the communication system comprising at least a cell, the method comprising the steps of: covering at least a portion of the cell with a broadcast beam; assigning a streaming beam for each active mobile station on the portion of the cell, if a number of active mobile station on the portion is smaller than a first threshold, wherein a direction of the beams is adjusted according to a position of the active mobile stations. The method further comprises selecting a group of active mobile stations by obtaining at least two active mobile stations with a closest angular distance of all possible pairs of active mobile stations and assigning a single streaming beam to the group of active mobile station, if the number of active mobile stations is bigger than the first threshold.

14 Claims, 6 Drawing Sheets

SEMI-STATIC BEAMFORMING METHOD AND APPARATUS THEREOF

BACKGROUND OF THE INVENTION

The invention is based on a priority application EP08290467.3 which is hereby incorporated by reference.

The invention relates to a beamforming method in a base station for a mobile communication system, to a base station for a mobile communication system, to a mobile communication system and to a computer program product.

The signal processing technique of beamforming may be used with arrays of transmitting or receiving transducers that control the directionality of a radiation pattern. When receiving a signal, beamforming can increase the receiver sensitivity in the direction of wanted signals and decrease the sensitivity in the direction of interference and noise. When transmitting a signal, beamforming can increase the power in the direction the signal is to be sent. The change compared with an omnidirectional transmission is known as the transmission gain. These changes are done by creating beams and nulls in the radiation pattern.

SUMMARY OF THE INVENTION

A beamforming method in a base station for a mobile communication system, the communication system comprising at least a cell, the method comprising the steps of: covering at least a portion of the cell with a broadcast beam; assigning a streaming beam for each active mobile station on the portion of the cell, if a number of active mobile station on the portion is smaller than a first threshold, wherein a direction of the beams is adjusted according to a position of the active mobile stations. The method further comprises selecting a group of active mobile stations by obtaining at least two active mobile stations with a closest angular distance of all possible pairs of active mobile stations and assigning a single streaming beam to the group of active mobile station, if the number of active mobile stations is bigger than the first threshold.

An advantage of the embodiments is that allows using semi-static beams, where the pattern and the direction of the beam are chosen adaptively and according to the traffic distribution of the portion of the cell. Each beam can get assigned a single user or a group of users, according to the total number of active users and their location within the portion of the cell.

In an embodiment, the portion of the cell is a sector and the cell is divided in a set of sectors. In a further embodiment, the selection of the group of active mobile stations further comprises analyzing a direction or a velocity pattern of each active mobile station of the group.

In further embodiments, the selection of the group of active mobile stations excludes active mobile station moving at a velocity bigger than a second threshold. The selection of the group of active mobile stations further comprises obtaining a position of each active mobile station with a direction of arrival (DoA) algorithm.

In other embodiments, the beamforming method further comprises: forming a set of equidistant fixed beams covering the portion of the cell, if the closest angular distance of the group of active mobile stations is bigger than a third threshold.

Another advantage of the embodiments is that, according to the location of the active mobile stations, static beamforming or fixed beams may be selected, where a number of beams with typically equidistant direction cover the cell area.

In further embodiments, a first and a second beam of the set of beams share same frequency resource, if an angular distance between the first and second beams is bigger than a forth threshold.

In further embodiments, the active mobile stations feedbacks information related to channel characteristics to the base station. The channel characteristics comprise quality and strength of a received signal by the active mobile station. The quality of the quality and strength of a received signal is measured with a bit error probability of the received signals.

In another aspect, the invention relates to a base station for a mobile communication system, being operable to perform in accordance with any one of the preceding claims.

In another aspect, the invention relates to a mobile communication system for beamforming, the mobile communication system being operable to perform in accordance with any one of the preceding embodiments.

In another aspect, the invention relates to a computer program product stored on a storage medium, comprising executable program means for causing a base station to perform a method according to any of the preceding claims embodiments when the program is run on the base station.

BRIEF DESCRIPTION OF THE DRAWINGS

In the following preferred embodiments of the invention will be described in greater detail by way of example only making reference to the drawings in which.

DETAILED DESCRIPTION

Figure 1:
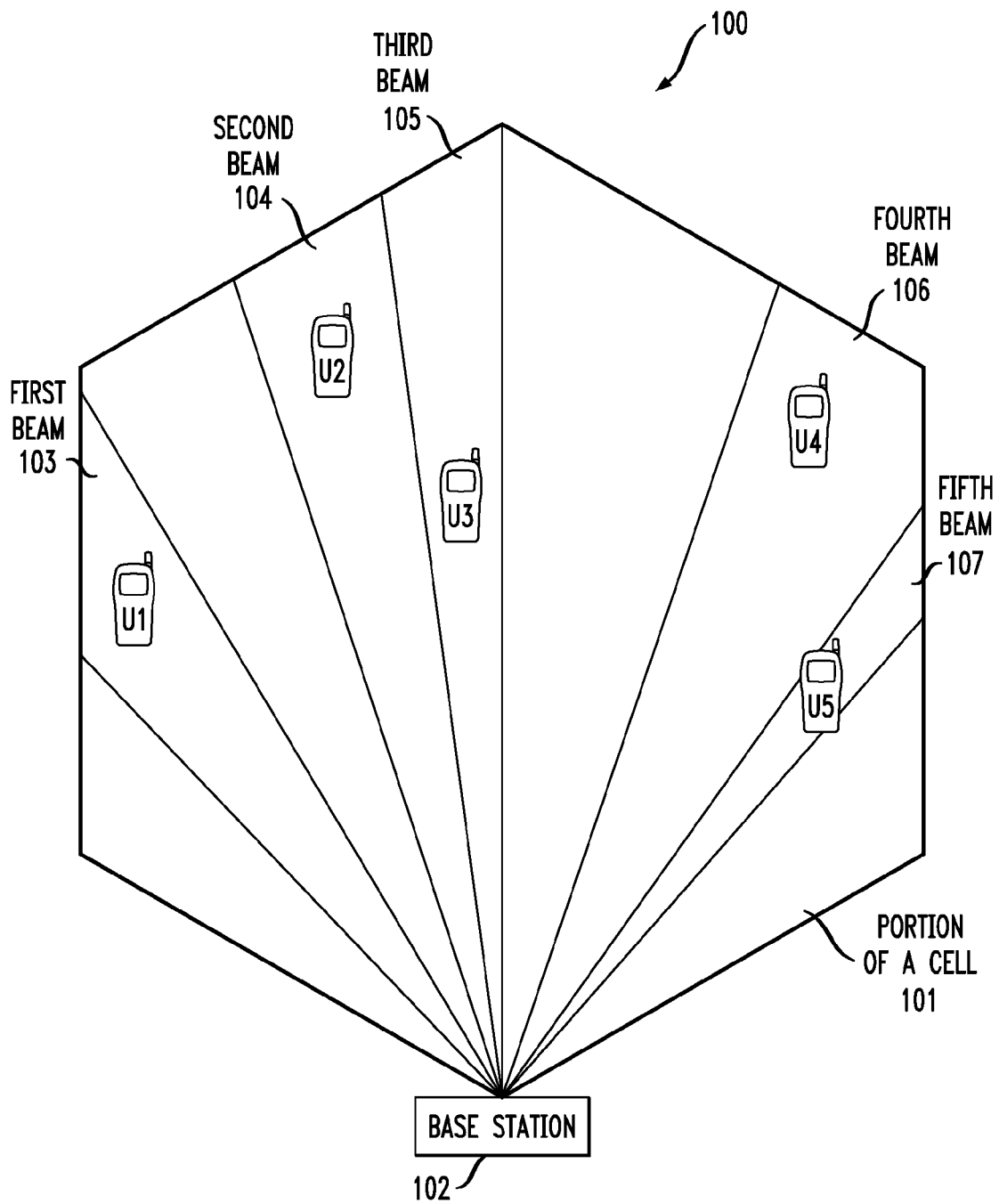
FIG. 1 shows a block diagram of a mobile communication system.

FIG. 1 shows a block diagram of a mobile communication system 100 including a cell 101, a base station 102 and a plurality of mobile stations U1 to U5 located in different positions within the cell 101. A broadcast beam (not illustrated) covers the whole cell 101. A beam is assigned for each active mobile station on the cell 101, if the number of active mobile stations on the cell 101 is smaller than a first threshold. For the configuration shown in FIG. 1, the first threshold is of six active mobile stations, so that each mobile station U1 to U5 gets assigned a different beam: the beams 103 is assigned to U1, and the beam 104-107 is assigned to the mobile stations U2 to U5, respectively. The direction of each of the beams 103-107 is adjusted according to the position of the active mobile stations.

Figure 2:
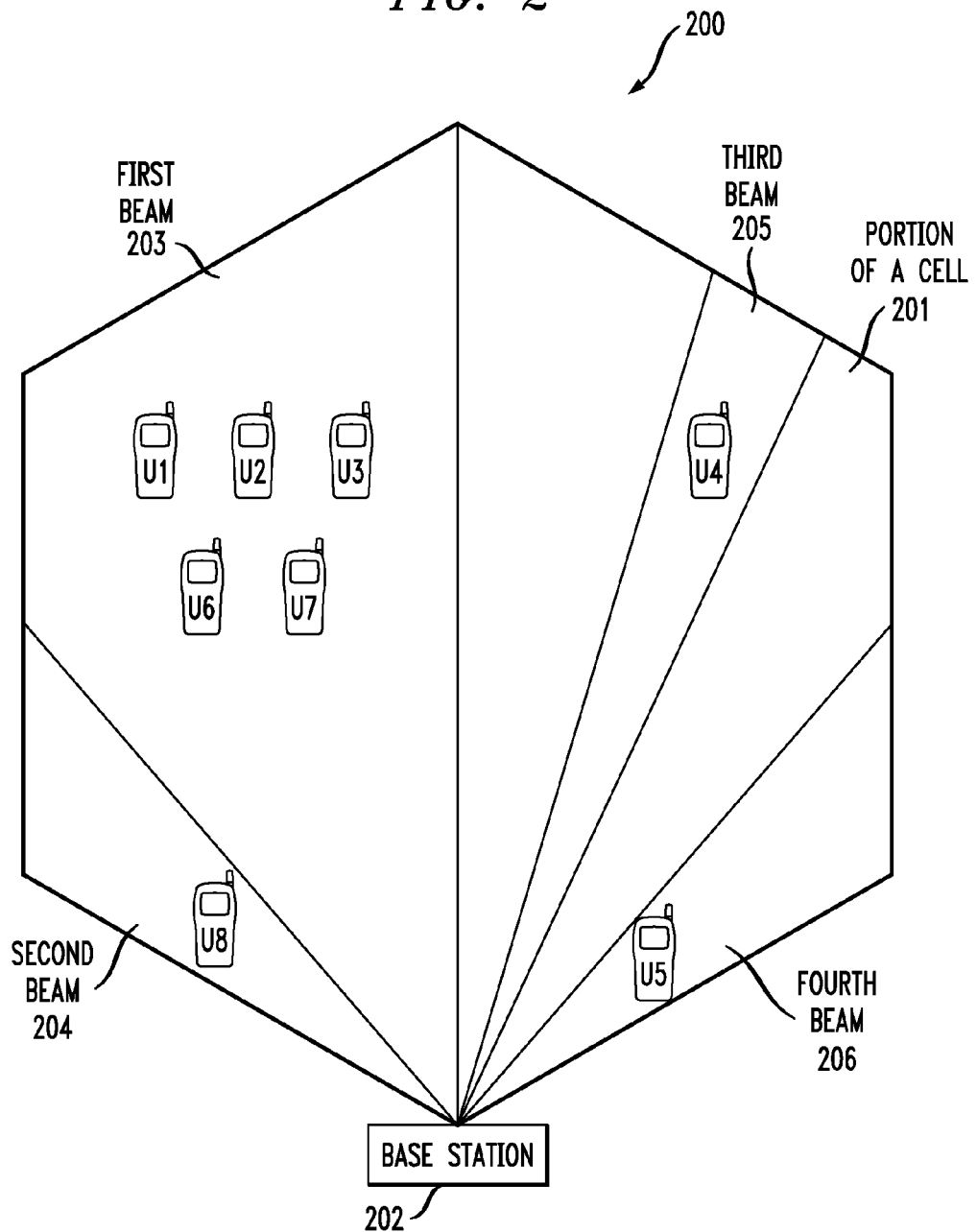
FIG. 2 shows a second block diagram of a mobile communication system.

FIG. 2 shows a second configuration of a mobile communication system 200 comprising a portion of a cell 201, a base station 202 and a plurality of mobile stations U1 to U8. A broadcast beam covers the complete portion of the cell 201.

The mobile communication system 200 also shows the changes that may occur in the location and in the number of active mobile stations within a cell or a portion of a cell. The first threshold, that set the limit of using a single beam per user, is of six. In this case, there are eight active mobile users, corresponds to a bigger number than the first threshold. When the number of active mobile stations is bigger than the first threshold, a group of active mobile stations is selected, wherein that selected group has the closest angular distance of all possible groups of active mobile stations. This group gets assigned a single beam.

Following the configuration of the mobile communication system 200, the beam 203 groups five active mobile stations U1, U2, U3, U6 and U7 and they are all assigned to the same beam. This group corresponds to the closest angular distance of all possible groupings of active mobile stations. The angular distance is measured by the base station by obtaining the difference of angle of arrival The rest of the active mobile stations get assigned a single beam. Mobile station U8 gets assigned beam 204, mobile station U4 gets assigned beam 205 and mobile station U5 gets assigned the beam 206. The grouping of the active mobile stations may correspond to different selection algorithms. On a first alternative, all possible angular distances of pairs of active mobile stations are measured and the pair with the smallest angular distance is first selected. Then, an angular distance between this selected pair and a third or more active mobile stations is measured and added to the group if within an angular distance threshold.

The beams with a single user or with a group of active mobile stations adjust the direction of the beam according to the position of at least one of the mobile stations. In an alternative, the first mobile station that has entered the network may define the direction of the semi-static beam. The position of each active mobile station may be obtained using a direction of arrival (DOA) algorithm. Alternatively, it is possible to obtain the position of the active mobile stations receiving a feedback of the global positioning system receivers that the active mobile station may include. If two beams within a cell or a portion of a cell, as for example beams 204 and 206, present an angular distance bigger than a threshold, these two beams may share the same frequency resources.

Figure 3:
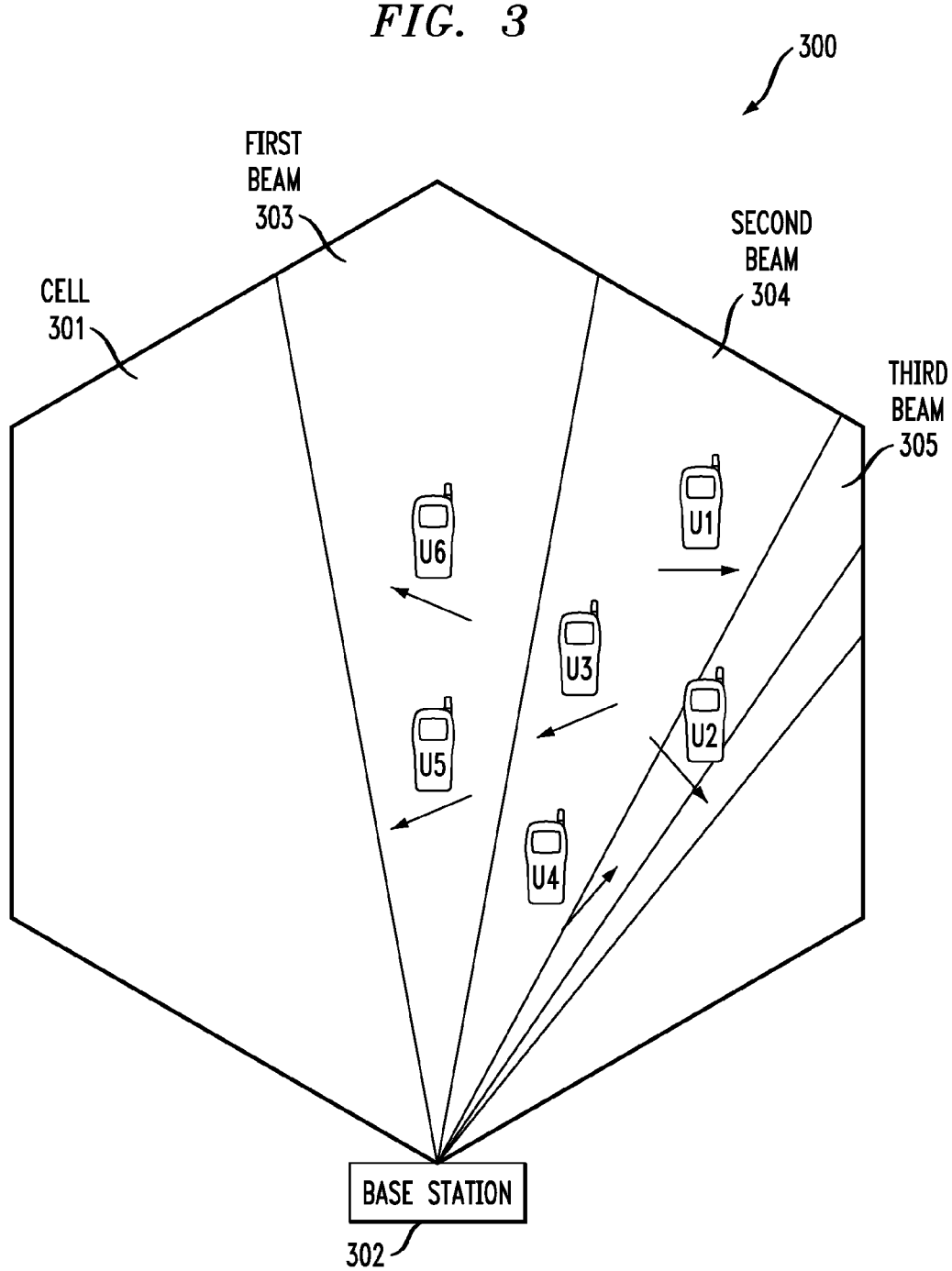
FIG. 3 shows an embodiment of a mobile communication system.

FIG. 3 shows an embodiment of a mobile communication system 300 comprising a cell portion 301 and a base station 302. The system 300 further comprises six active mobile stations U1 to U6 within two beams 303 and 304. The portion of the cell 301 is covered by a broadcast beam not illustrated in the figure.

As the mobile stations within a cell or a portion of the cell may relatively change its direction and speed to the base station is communicating with, it is possible to make the selection of the group of active mobile stations analyzing their direction pattern. Alternatively, both the direction and the velocity pattern of each active mobile station can be used in the selection of the group of active mobile stations.

In the FIG. 3, active mobile stations U5 and U6 have been both grouped into the beam 303, as they are moving in a similar direction and with a similar velocity pattern. Mobile stations U1, U3 and U4 have all been grouped into beam 304, as they are all moving at a very low speed, or are not moving at all. It is also possible to assign a specific beam for an active mobile station that is moving at a velocity bigger than a second threshold. In that case, the beam follows the mobile station throughout the whole cell. This is the case of beam 305 following the user U2. In another embodiment, the mobile station U2 is assigned to the beam 304, as the actual position is closed to the other active mobile stations within that group.

The active mobile stations U1 to U6 feedback to the base station 302 information related to the channel characteristics. These channel characteristics may comprise quality and strength of a received signal and it can be measured with a bit error probability of the received signals.

Figure 4:
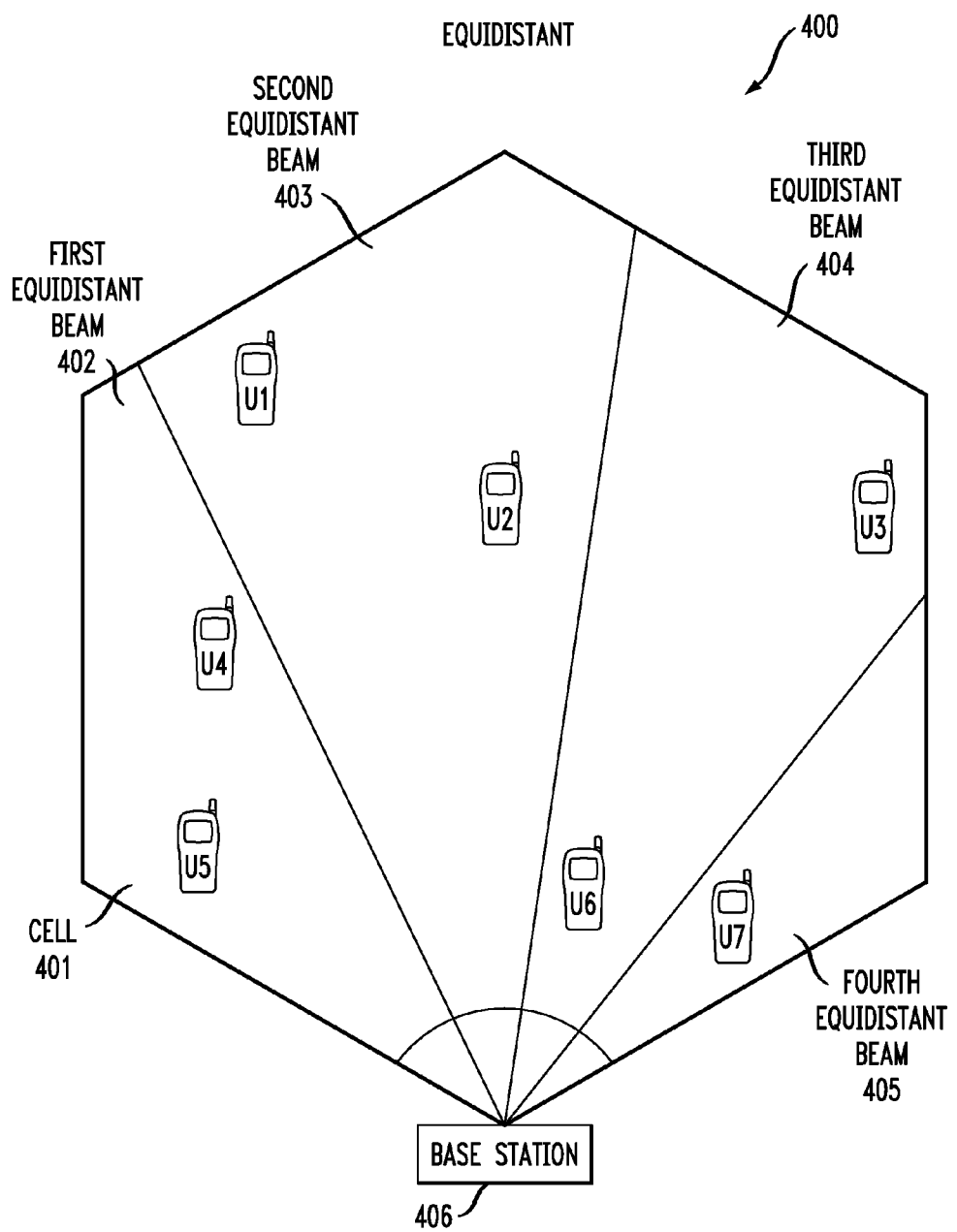
FIG. 4 shows a further embodiment of a mobile communication system.

FIG. 4 shows a further embodiment of a mobile communication system 400 including a cell 401, a base station 402 and a plurality of active mobile stations U1 to U7 positioned over the whole cell 401.

The number of active mobile stations within the cell 401 is seven, which is bigger than the first threshold of six. Therefore, the active mobile station should be grouped forming a group of at least two active mobile stations with the closest angular distance. As the angular distance between all possible groupings of mobile stations is bigger than a third threshold, no specific beam can be assigned to a group of active mobile stations. In this case, a set of equidistant fixed beams comprising 402 to beam 405 is formed. The first beam 402 covers mobile stations U4 and U5, the second beam 403 covers active mobile stations U1 and U2, beam 404 covers active mobile stations U3 and U6, and beam 405 covers active mobile station U7.

Figure 5:
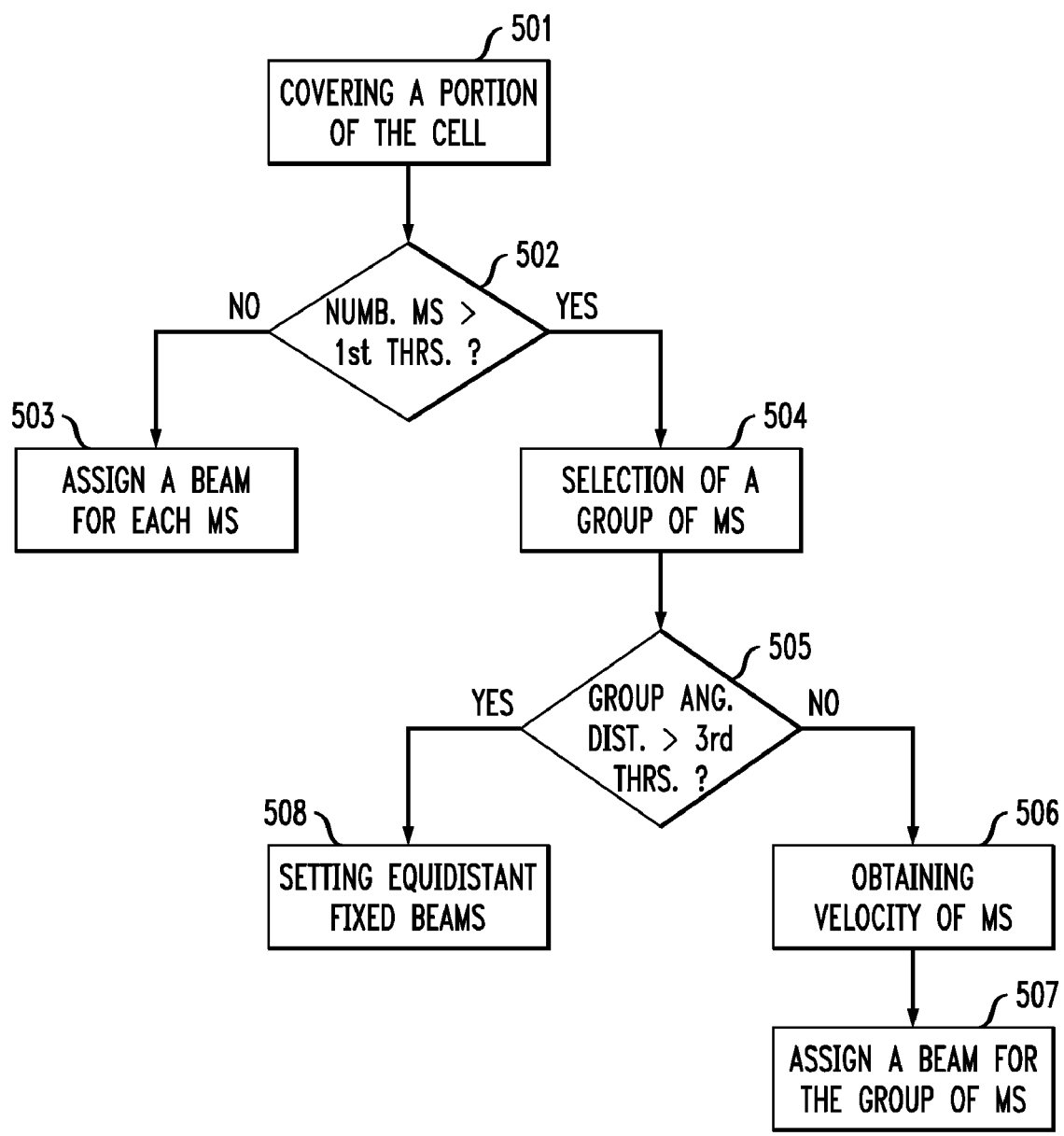
FIG. 5 shows a flow diagram of a method of beamforming.

FIG. 5 shows a flowchart of a beamforming method in a base station for a mobile communication system comprising a first step 501 covering at least a portion of the cell with a broadcast beam. In a second step 502, the number of active mobile station in the portion of the cell is compared with the first threshold. A beam is assigned for each active mobile station on the portion of the cell on a third step 503, if the number of active mobile stations on the sector is smaller than a first threshold. The direction of the beams is adjusted according to the position of the active mobile stations. In a forth step 504, a group of active mobile stations that corresponds to the closest angular distance of all possible groups of active mobile stations is selected.

In the fifth step 505, the closest angular distance of the groups of active mobile stations is compared with a third threshold. In a sixth step 506 of the method, the velocity of the active mobile stations is obtained and the active mobile stations with velocities bigger than the second threshold are excluded of the grouping selection. In the seventh step 507, the group gets assigned a single beam, if the number of active mobile stations is bigger than the first threshold. The method further comprises an eight step 508, where a set of equidistant fixed beams covering the portion of the cell are formed, if the closest angular distance of the groups of active mobile stations is bigger than a third threshold.

Figure 6:
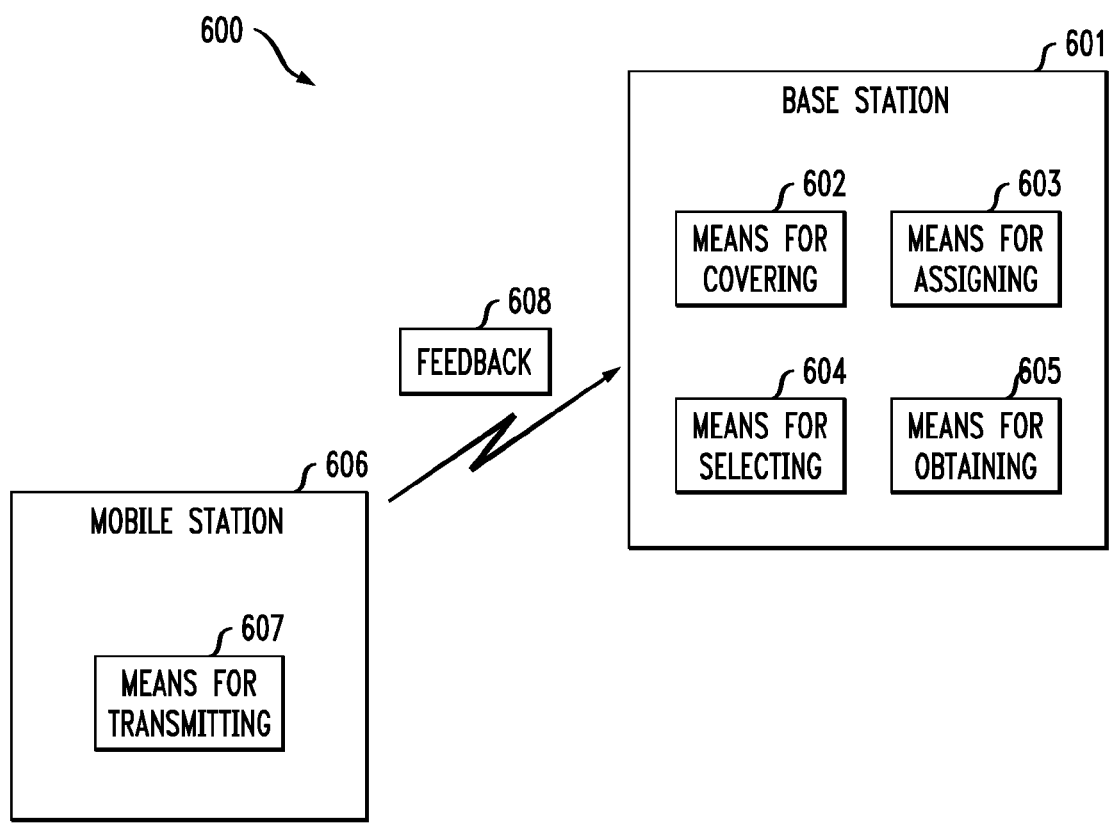
FIG. 6 shows a further embodiment of a mobile communication system.

FIG. 6 describes a mobile communication system 600 comprising a base station 601 comprising means for 602 covering at least a portion of the cell with the broadcast beam; means for 603 assigning a beam for each active mobile station on the portion of the cell if a number of active mobile stations is smaller than a first threshold; means for 604 selecting a group of active mobile stations with the closest angular distance of all possible groups of active mobile stations and grouping them into a single beam, if the number of active mobile stations is bigger than the first threshold. The base station 601 further comprises means for 605 obtaining a position of each active mobile station with a direction of arrival algorithm. The base station 601 may include a computer program product to perform some of the steps and/or algorithms described. The mobile communication system 600 further comprises a mobile station 606 including means for 607 transmitting feedback information 608 to the base station 601.

| List of Reference Numerals | |
| --- | --- |
| 100 | Mobile communication system |
| 101 | Portion of a cell |

-continued

| List of Reference Numerals | |
|---|---|
| 102 | Base station |
| 103 | First beam |
| 104 | Second beam |
| 105 | Third beam |
| 106 | Fourth beam |
| 107 | Fifth beam |
| 200 | Mobile communication system |
| 201 | Portion of a cell |
| 202 | Base station |
| 203 | First beam |
| 204 | Second beam |
| 205 | Third beam |
| 206 | Fourth beam |
| 300 | Mobile communication system |
| 301 | Cell |
| 302 | Base station |
| 303 | First beam |
| 304 | Second beam |
| 305 | Third beam |
| 400 | Mobile communication system |
| 401 | Cell |
| 402 | First equidistant beam |
| 403 | Second equidistant beam |
| 404 | Third equidistant beam |
| 405 | Fourth equidistant beam |
| 500 | Method of beamforming |
| 501 | First step |
| 502 | Second step |
| 503 | Third step |
| 504 | Fourth step |
| 505 | Fifth step |
| 506 | Sixth step |
| 507 | Seventh step |
| 508 | Eight step |
| 600 | Mobile communication system |
| 601 | Base station |
| 602 | Means for covering |
| 603 | Means for assigning |
| 604 | Means for selecting |
| 605 | Means for obtaining |
| 606 | Mobile station |
| 607 | Mean for transmitting |
| 608 | Feedback |

The invention claimed is:

1. A beamforming method in a base station for a mobile communication system, the communication system comprising at least a cell, the method comprising:
covering at least a portion of the cell with a broadcast beam;
assigning a streaming beam for each active mobile station on the portion of the cell, if a number of active mobile stations on the portion is less than a first threshold, wherein a direction of the beams is adjusted according to a position of the active mobile stations; and
selecting a group of active mobile stations by obtaining at least two active mobile stations with a closest angular distance of all possible pairs of active mobile stations and assigning a single streaming beam to the group of active mobile stations, if the number of active mobile stations is greater than the first threshold.

2. A method as in claim 1, wherein the portion of the cell is a sector and the cell is divided in a set of sectors.

3. A method as in claim 1, wherein the selection of the group of active mobile stations further comprises analyzing a direction pattern of each active mobile station of the group.

4. A method as in claim 3, wherein the selection of the group of active mobile stations further comprises analyzing a velocity pattern of each active mobile station of the group.

5. A method as in claim 4, wherein the selection of the group of active mobile stations excludes active mobile station moving at a velocity greater than a second threshold.

6. A method as in claim 1, wherein the selection of the group of active mobile stations further comprises obtaining a position of each active mobile station with a direction of arrival algorithm.

7. A method as in claim 1, wherein the beamforming method further comprises: forming a set of equidistant fixed beams covering the portion of the cell, if the closest angular distance of the group of active mobile stations is greater than a third threshold.

8. A method as in claim 1, wherein a first and a second beam of the set of beams share same frequency resource, if an angular distance between the first and second beams is greater than a forth threshold.

9. A method as in claim 1, wherein the active mobile stations feedback information related to channel characteristics to the base station.

10. A method as in claim 9, wherein the channel characteristics comprise quality and strength of a received signal by the active mobile station.

11. A method as in claim 10, wherein the quality of the quality and strength of a received signal is measured with a bit error probability of the received signals.

12. A base station for a mobile communication system comprising:
a beam controlling processor that is operative to cover at least a portion of a cell of the base station with a broadcast beam,
assign a streaming beam for each active mobile station on the portion of the cell, if a number of active mobile stations on the portion is less than a first threshold, wherein a direction of the beams is adjusted by the processor according to a position of the active mobile stations; and
select a group of active mobile stations by obtaining at least two active mobile stations with a closest angular distance of all possible pairs of active mobile stations and assign a single streaming beam to the group of active mobile stations, if the number of active mobile stations is greater than the first threshold.

13. A mobile communication system comprising:
a beam controlling processor that is operative to cover at least a portion of a cell of the mobile communications system with a broadcast beam;
assign a streaming beam for each active mobile station on the portion of the cell, if a number of active mobile stations on the portion is less than a first threshold, wherein a direction of the beams is adjusted by the processor according to a position of the active mobile stations; and wherein the processor is operative to
select a group of active mobile stations by obtaining at least two active mobile stations with a closest angular distance of all possible pairs of active mobile stations and assign a single streaming beam to the group of active mobile stations, if the number of active mobile stations is greater than the first threshold.

14. A computer program product stored on a non-transitory storage medium, comprising executable program means for causing a base station to perform a beamforming method in the base station for a mobile communication system, the communication system comprising at least a cell, the method comprising:
covering at least a portion of the cell with a broadcast beam;
assigning a streaming beam for each active mobile station on the portion of the cell, if a number of active mobile stations on the portion is less than a first threshold, wherein a direction of the beams is adjusted according to a position of the active mobile stations; and selecting a group of active mobile stations by obtaining at least two active mobile stations with a closest angular distance of all possible pairs of active mobile stations and assigning a single streaming beam to the group of active mobile stations, if the number of active mobile stations is greater than the first threshold.

* * * * *